United States Patent [19]

Miura et al.

[11] Patent Number: 4,682,496

[45] Date of Patent: Jul. 28, 1987

[54] FLOW RATE DETECTING APPARATUS HAVING SEMICONDUCTOR CHIPS

[75] Inventors: Kazuhiko Miura, Aichi; Tadashi Hattori; Yukio Iwasaki, both of Okazaki; Tokio Kohama, Nishio; Kenji Kanehara, Aichi, all of Japan

[73] Assignee: Nippon Soken, Inc., Nishio, Japan

[21] Appl. No.: 690,245

[22] Filed: Jan. 10, 1985

[30] Foreign Application Priority Data

Jan. 18, 1984 [JP] Japan .................................. 59-7591

[51] Int. Cl.⁴ .............................................. G01F 1/68
[52] U.S. Cl. ..................................................... 73/204
[58] Field of Search ........................................... 73/204

[56] References Cited

U.S. PATENT DOCUMENTS

| | | | |
|---|---|---|---|
| 3,085,431 | 4/1963 | Yerman et al. | 73/204 |
| 3,683,692 | 8/1972 | Lafitte | 73/204 |
| 3,881,181 | 4/1975 | Khayezadeh . | |
| 3,942,378 | 3/1976 | Olmstead | 73/204 |
| 3,988,928 | 11/1976 | Edstrom et al. | 73/204 |
| 3,992,940 | 11/1976 | Platzer, Jr. . | |
| 4,089,214 | 5/1978 | Egami et al. . | |
| 4,304,129 | 12/1981 | Kawai et al. . | |
| 4,399,697 | 8/1983 | Kohama et al. . | |
| 4,425,792 | 1/1984 | Kohama et al. . | |
| 4,433,576 | 2/1984 | Shih et al. . | |
| 4,478,077 | 10/1984 | Bohrer et al. . | |

OTHER PUBLICATIONS

Huijsing et al "Monolithic Integrated Direction-Sensitive Flow Sensor", IEEE Trans. on Electronic Devices ED-29 #1 1/82, 133-136.
Huijsing et al "Integrated Direction-Sensitive Flowmeter", Electronics Letter, vol. 12, No. 24, 1/25/76, pp. 647-648.

Primary Examiner—Herbert Goldstein
Attorney, Agent, or Firm—Cushman, Darby & Cushman

[57] ABSTRACT

A semiconductor type flow rate detecting apparatus having first and second control units arranged at upstream and downstream positions respectively in a flow stream to be measured and an operation circuit. The first control unit includes a first temperature detecting element and a first temperature control heater. The second control unit includes a second temperature detecting element, a second temperature control heater and a preliminary heater. The operation circuit controls the second and preliminary heaters and generates a signal indicative of flow rate. The operation circuit has a constant power consumption circuit to control heat from the preliminary heater to a constant level.

7 Claims, 15 Drawing Figures

FLOW RATE DETECTING APPARATUS HAVING SEMICONDUCTOR CHIPS

BACKGROUND OF THE INVENTION

1. Field of the Invention

The present invention relates to a flow rate detecting apparatus having semiconductor chips suitably used for detecting, for example, an intake air flow rate of an engine.

2. Description of the Related Art

A Thomas meter or a heating wire flow meter using a platinum resistor wire has been known as a typical conventional flow meter. However, in such a conventional flow meter, the measuring element exposed to a fluid comprises a wire which is subject to disconnection due to vibration, mechanical impact or the like.

Another conventional flow meter is also known wherein a resistor film is deposited or printed on an insulating substrate such as a ceramic substrate. In this flow meter, since the measuring element is constituted by a film, it can withstand mechanical vibration or the like. However, since the resistor film is deposited or printed on the insulating substrate, it is difficult to perform micropatterning, and thus, the size of the measuring element is necessarily increased. As a result, the heat capacity of the measuring element is also increased, degrading the response characteristic of the flow meter.

In this conventional flow meter, there are provided an element for producing heat and detecting temperature by the produced heat and an element for detecting fluid temperature. The heat producing element includes a heater resistor mounted on a support member. Some heat is lost through the sppport member without being utilized as heat radiation, so that the sensitivity of the flow rate detection is deteriorated.

SUMMARY OF THE INVENTION

The present invention has been made to resolve the above conventional problems, and has as its object the provision of a semiconductor type flow rate detecting apparatus comprising: a first control unit located upstream of a flow path and having a temperature detecting element and a temperature control heater; and a second control unit located downstream of the first control unit and having a temperature detecting element, a temperature control heater, a preliminary heater, and an operation circuit unit having a constant power consumption circuit. The operation circuit unit controls the preliminary heater to ensure a constant heat generation from the preliminary heater.

DESCRIPTION OF THE PREFERRED EMBODIMENT

The preferred embodiments of the present invention will be described below with reference to the accompanying drawings.

Figure 1:
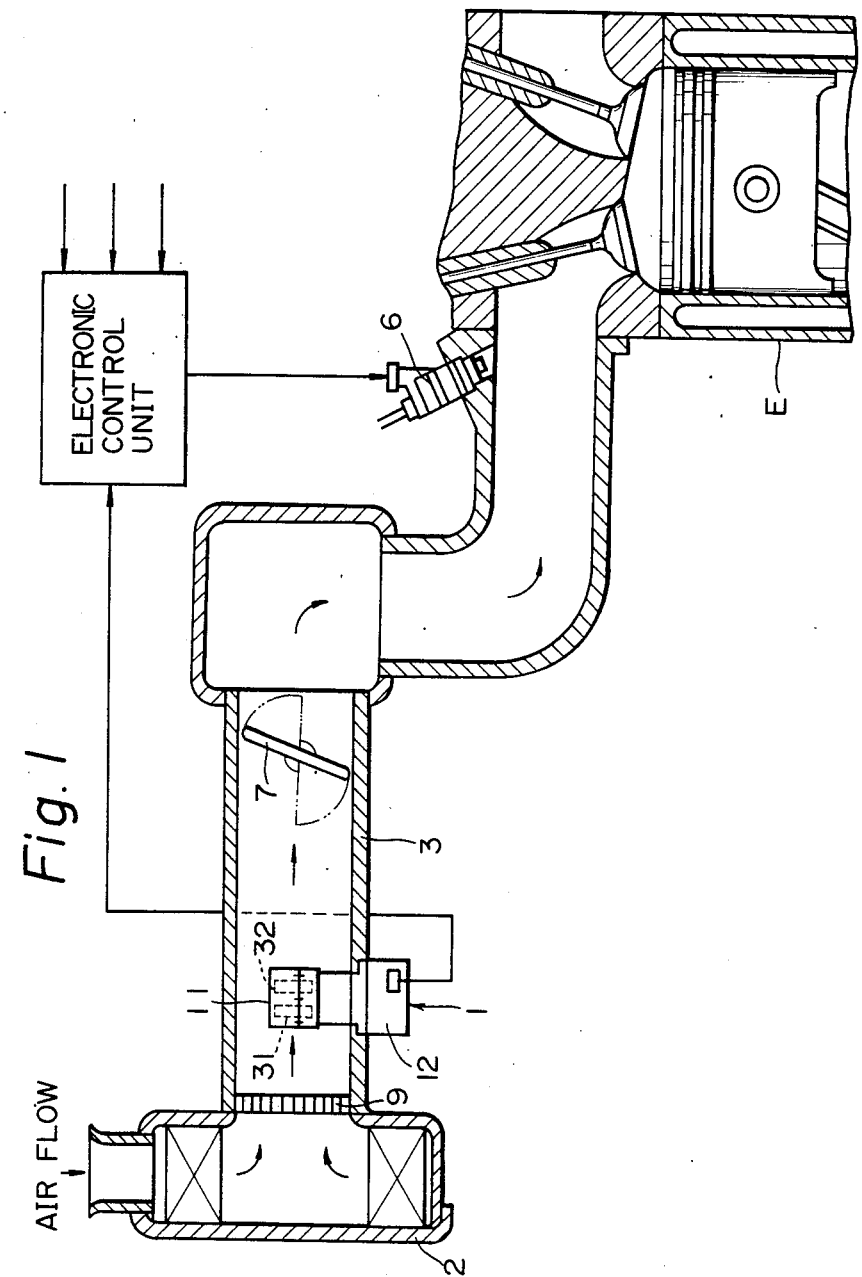
FIG. 1 is a sectional view showing an engine and manifold in which a semiconductor type flow rate detecting apparatus is adapted according to an embodiment of the present invention.

FIG. 1 shows a fuel injection ignition type engine which utilizes a semiconductor type flow rate detecting apparatus according to an embodiment of the present invention. In the figure, an engine E receives combustion air into combustion chambers through an air cleaner 2 and an intake manifold 3 when an intake valve is opened, fuel is injected from an electromagnetic fuel injection valve 6 disposed in the intake manifold 3, and the flow rate of the intake air is controlled by a throttle valve 7 disposed in the intake manifold 3. Fuel injection quantity is controlled by the fuel injection valve 6 to match the flow rate of the intake air or its corrected value, obtained by adding a correction value to the flow rate of the intake air.

A baffle grating 9 is disposed at one end of the manifold 3, at a point directly in the path of the air flow from the air cleaner 2. The grating 9 guides the intake air flow in such a manner that the measuring precision of the flow rate detecting apparatus is improved.

In an air intake system of the engine E, a semiconductor type flow rate detecting apparatus 1 is arranged in the intake manifold 3 between a throttle valve 7 and the baffle grating 9. The apparatus 1 measures a flow rate of the intake air into the engine E and supplies a corresponding electrical signal to an electronic control unit 8. The apparatus 1 comprises a sensing portion 11 and an operation circuit 12. The sensing portion 11 is arranged inside the intake manifold 3.

Figure 2:
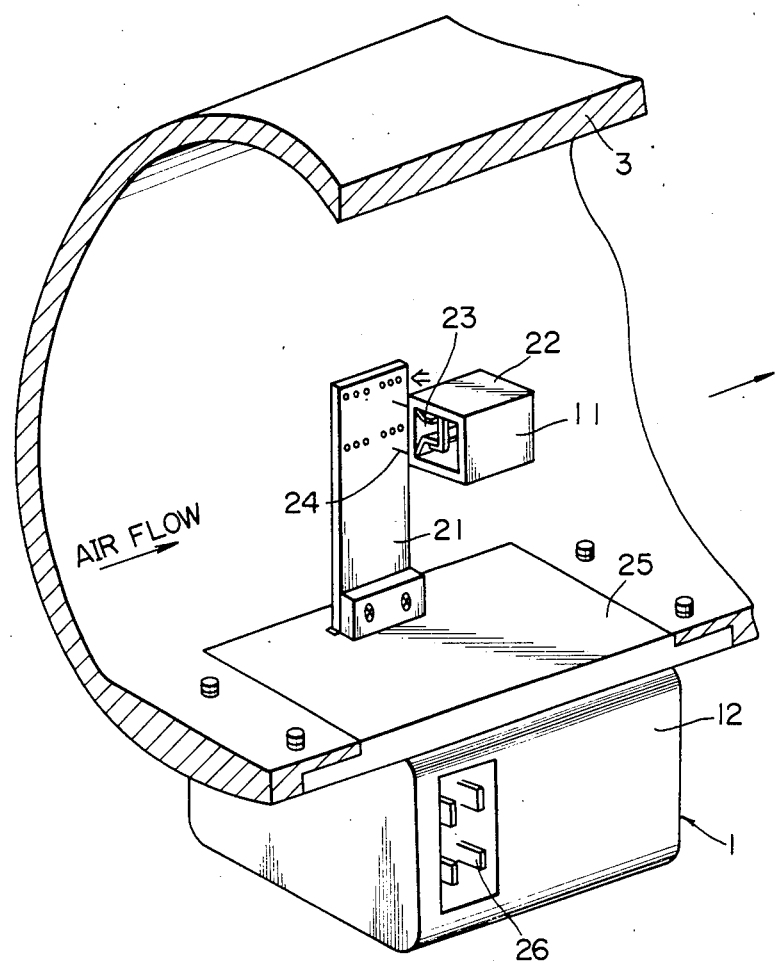
FIG. 2 is a cutaway perspective view showing the main part of the apparatus of FIG. 1.

The detecting apparatus 1 will be described with reference to FIG. 2 showing the positioning of the apparatus 1 when mounted in the intake manifold 3. As can be seen in the figure, the semiconductor flow rate detecting circuit 1 comprising the sensing portion 11 and the operation circuit 12 is fixed by screws to the air intake manifold 3.

The sensing portion 11 comprises a ceramic or plastic casing support plate 21 and a casing 22, with a flow path 23 formed in the casing 22. The casing 22 is supported on the support plate 21 in such a manner that the flow path 23 runs parallel to a central portion of the intake manifold 3, at which air flow speed is highest.

The sensing portion 11 comprises a dual in-line package chip having two arrays of pins, and after evaluation by an IC tester, a DIP chip inserted in a space in the support plate 21 and fixed by an adhesive. The support plate 21 comprises a printed circuit board for transmitting a signal from the sensing portion 11 to the operation circuit 12. Reference numeral 25 denotes a plate constituting part of the housing of the operation circuit 12 and mounted on the intake manifold 3. The plate 25 extends partially along the axial direction of the intake manifold 3 to firmly fix the support plate 21. The operation circuit 12 processes an output signal through a connector 26 from a semiconductor chip made of silicon or the like and generates a signal representing a flow rate.

Figure 3:
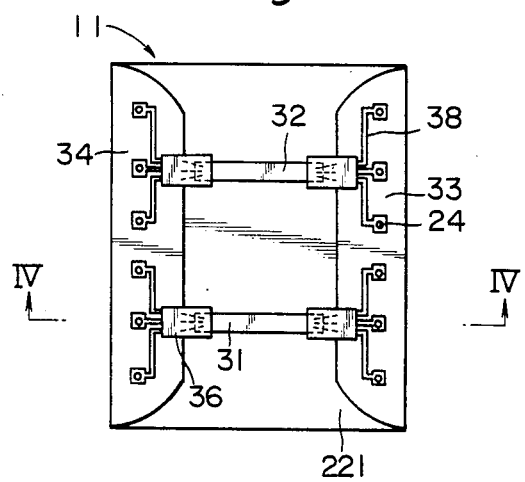
FIG. 3 is a front view showing the internal arrangement of a sensing portion of FIG. 2.
Figure 4:
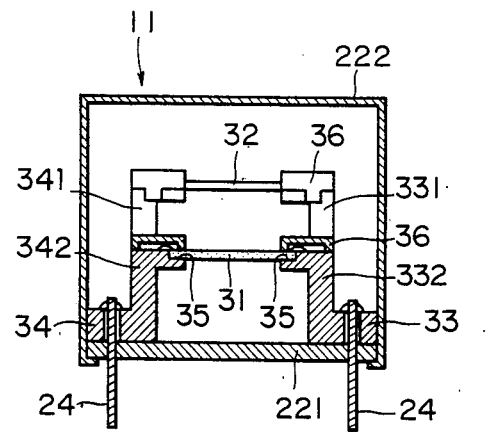
FIG. 4 is a sectional view of the sensing portion taken along the line IV—IV of FIG. 3.
Figure 5:
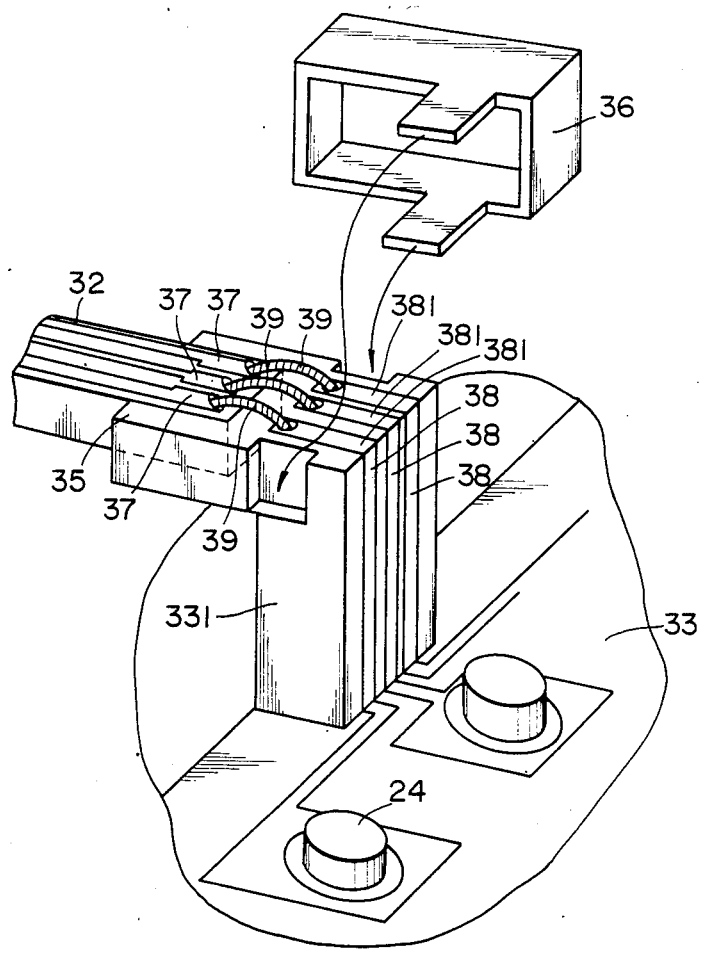
FIG. 5 is a perspective view showing a construction of a neck of the sensing portion of FIG. 4 and a mounting state of a cap.

A detailed construction of the sensing portion 11 will be described with reference to FIGS. 3, 4, and 5. Reference numeral 31 denotes a rod-like first semiconductor chip comprising a first control section. The first control section comprises a temperature detecting element and a temperature control heater. Reference numeral 32 denotes a rod-like second semiconductor chip comprising a second control section. The second control section comprises a temperature detecting element, a temperature control heater, and an additional heater. The second semiconductor chip 32 is arranged downstream and in the vicinity of the first semiconductor chip 31 in such a manner that it will not be substantially disturbed by irregularities in the intake air caused by the first semiconductor chip 31.

Reference numerals 33 and 34 denote ceramic housings for electrically connecting the pins 24 with the first and second semiconductor chips 31 and 32, respectively. A conductor paste 38 is printed and baked on the housings 33 and 34. The housings 33 and 34 are fixed on a casing base 221 made of PPS resin. The housings 33 and 34 have necks 331 and 332 and necks 341 and 342, respectively. The neck 331 has the same height as the neck 341, and the neck 332 has the same height as the neck 342. Holding grooves 35 each having a depth corresponding to a thickness of each of the first and second semiconductor chips 31 and 32 are formed at distal ends of the necks 331, 332, 341, and 342, respectively.

The first and second semiconductor chips 31 and 32 are fastened by an adhesive to the grooves 35, and the electrode ends of the first and second chips 31 and 32 are connected by wire-bonding to the electrode ends of the necks 331, 332, 341, and 342. More particularly, referring to FIG. 5, electrode ends 37 of the chip 32 and electrode ends 381 at the distal end of the neck 331 of the housing 33 are connected by wire-bonding by aluminum or gold wires 39.

A cap 36 covers the neck 331 to prevent disconnections of the metal wires 39 through vibration or similar conditions, and is fixed in place by an adhesive. Caps 36 of the same type also cover the other electrode necks, respectively.

The housings 33 and 34 and the chips 31 and 32 are covered by a casing cover 222, which allows ventilation and is fixed by an adhesive to the casing base 221.

The construction of the semiconductor chips 31 and 32 will be described with reference to FIGS. 6A, 6B, 6C, and 7.

The semiconductor temperature detecting element comprises a diode or transistor which has a linear forward voltage temperature characteristic of 2.0 to 2.5 mV/°C. or a diffusion resistance formed by diffusion which changes its resistance according to a change in temperature. In the apparatus shown in FIGS. 6A, 6B, 6C, and 7, the temperature detecting element comprises a diode, and the first semiconductor chip 31 comprises a diode and a temperature control heater. As shown in FIGS. 6A, 6B, 6C, and 7, the semiconductor chips comprise identical patterns and are arranged upstream and downstream of the air flow.

Referring to FIGS. 6A, 6B, 6C, and 7, hatched portions represent aluminum electrodes 311, 312, 321, and 322, respectively. Reference numeral 41 denotes a diode constituting the first temperature detecting element; 44, a diode constituting the second temperature detecting element; and 42, 43, and 45, diffusion resistance portions having the same temperature coefficient. The diffusion resistance portions 42 and 43 constitute temperature control heaters, and the diffusion resistance portion 45 constitutes a preliminary heater.

Figure 6A:
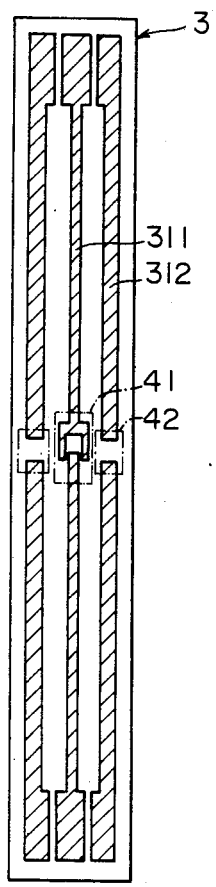
FIGS. 6A, 6B, 6C, and 7, respectively, are views showing the configuration of first and second semiconductor chips arranged in the sensing portion.
Figure 6B:
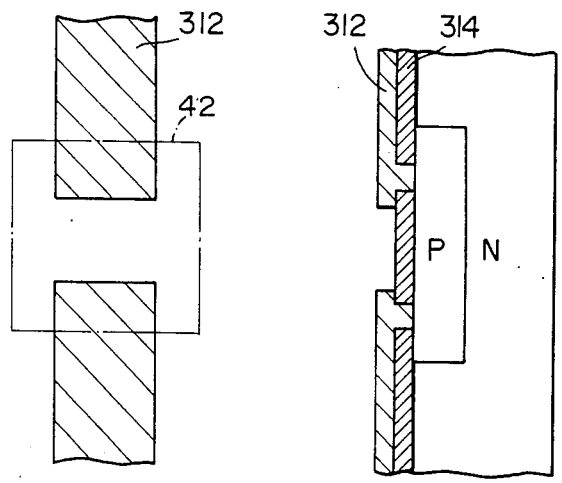
Figure 6C:
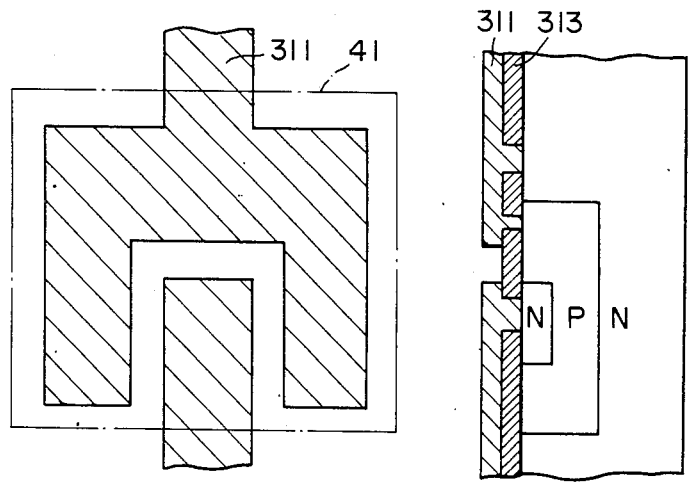
Figure 7:
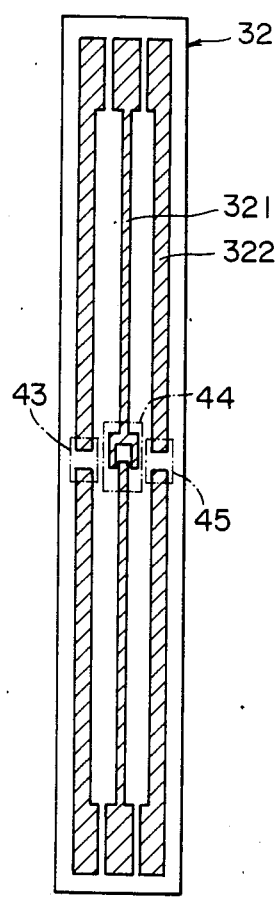

The construction of the diffusion resistance portion 42 is illustrated in FIG. 6B, and the construction of the diode 41 is illustrated in FIG. 6C. Reference numerals 313 and 314 denote silicon dioxide insulating films, respectively. The semiconductor substrate comprises an n-type epitaxial substrate. A p-type semiconductor layer is formed by doping boron in the substrate, and an n-type semiconductor layer is formed by doping phosphorus in the substrate.

As shown in FIGS. 6A, 6B, 6C, and 7, a temperature detecting element 41 and heaters 42 are formed substantially at the center of the first semiconductor chip 31. Similarly, a temperature detecting element 44 is formed substantially at the center of the second semiconductor chip 32, and heaters 44 and 45 are formed at two ends thereof to sandwich the second temperature detecting element 44. The second temperature detecting element 44 effectively detects heat from the heaters 43 and 45 to obtain a good response characteristic of the flow rate detecting apparatus.

Figure 8:
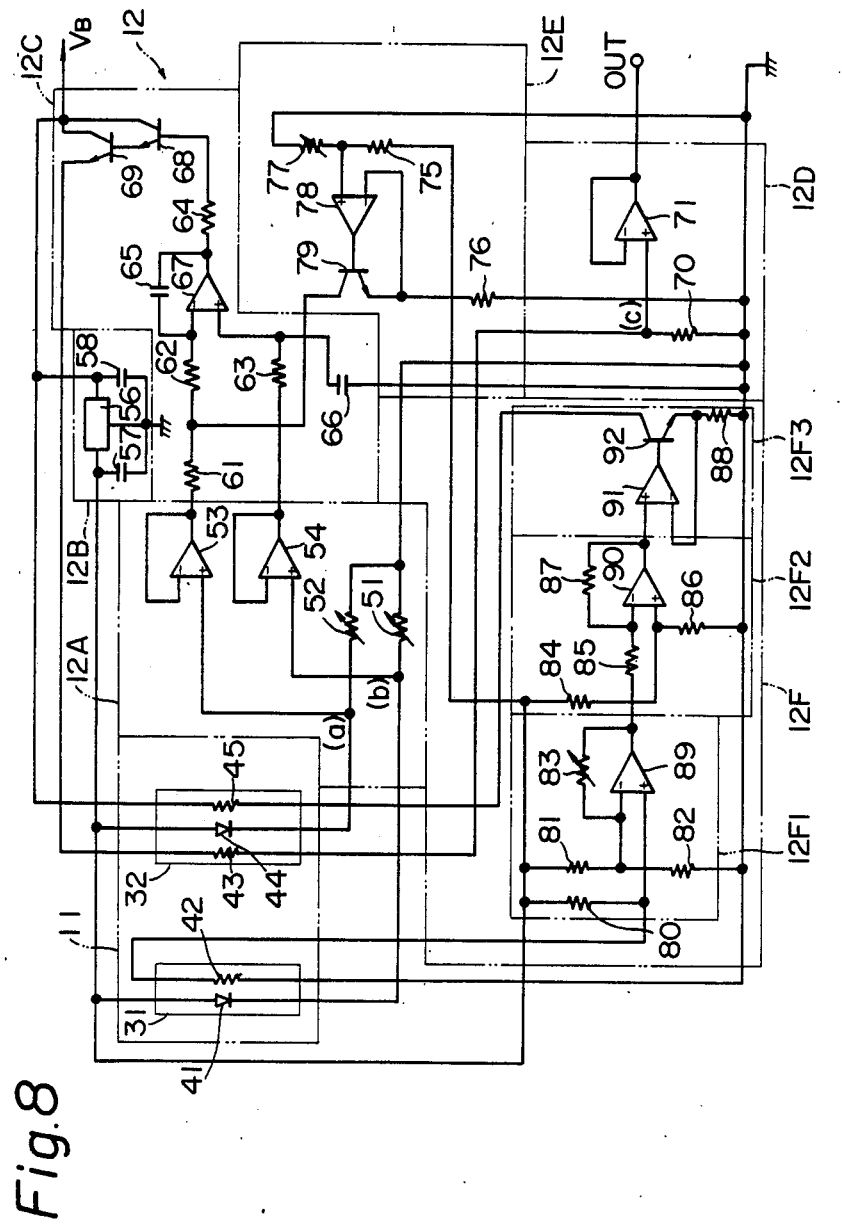
FIG. 8 is a circuit diagram of a circuit used in the present invention.

The detailed arrangement of the operation circuit 12 will be described with reference to FIG. 8. The operation circuit 12 processes the detection signal from the sensing portion 11 and generates an output signal representing a flow rate of the air flow. The operation circuit 12 comprises a buffer circuit 12A, a power source circuit 12B, a differential amplifier circuit 12C, an output circuit 12D, an offset circuit 12E, and a constant power consumption circuit 12F.

The buffer circuit 12A comprises variable resistors 51 and 52 for adjusting variations in the temperature coefficients of the temperature detecting elements 41 and 44, and operational amplifiers 53 and 54 as voltage followers for detecting the potentials at the elements 41 and 44, respectively.

The power source circuit 12B generates a stable voltage by using a battery voltage $V_B$ and comprises a voltage regulator 54 and capacitors 57 and 58.

The differential amplifier circuit 12C comprises resistors 61 to 64, capacitors 65 and 66, an operational amplifier 67, and power transistors 68 and 69. The potentials at the diodes 41 and 44, which depend on the air temperature, are differentially amplified, and amplified outputs drive the transistors 68 and 69 to control a voltage or current supplied to the heater 43. The capacitor 65 is arranged to provide a predetermined time constant to a feedback system.

The output circuit 12D comprises a current detecting resistor 70 and an operational amplifier 71 as a voltage follower.

The offset circuit 12E comprises resistors 75 and 76, a variable resistor 77, an operational amplifier 78, and a transistor 79. An offset voltage set by the resistors 75 and 77 is applied to a junction between the resistors 61 and 62. A voltage input to the inverting input terminal of the operational amplifier 67 is lowered by the offset voltage.

The constant power consumption circuit 12F comprises: a sensitivity adjustment amplifier circuit 12F1 having resistors 80 to 83 and an operational amplifier 89, to adjust the sensitivity of the temperature control heater diffusion resistance portion 42; a subtractor circuit 12F2 having resistors 84 to 87 and an operational amplifier 90; and a constant current circuit 12F3 having a resistor 88, an operational amplifier 91, and a transistor 92.

The diffusion resistance portions used as the temperature control heaters 42 and 43 and the preliminary heater 45 have a higher resistance when a temperature is within the range of between −40° C. and 110° C. When the preliminary heater diffusion resistance portion 45 is driven with a constant current, power consumption of the diffusion resistance portion 45 is increased in accordance with an increase in ambient temperature. By using the temperature control heater diffusion resistance portion 42 having the same temperature characteristics as the preliminary heater diffusion resistance portion 45, the constant power consumption circuit 12F controls power consumption by the preliminary heater diffusion resistance portion 45 to a constant level. That is a current flowing through the diffusion resistance portion 45 is controlled to compensate for an increase in power consumption due to an increase in resistance in the diffusion resistance portion 45. Thus, since the power consumption of the preliminary heater diffusion resistance portion 45 is kept at a constant level in the constant power consumption circuit 12F, an output voltage obtained by subtracting from a power source voltage of the power source circuit 12B a voltage corresponding to an increase in resistance of the additional heater diffusion resistance portion 45 is generated from the subtracter circuit 12F2. Accordingly, a current corresponding to this output voltage is supplied from the constant current circuit 12F3 to the additional heater diffusion resistance portion 45, thereby controlling the power consumption of this diffusion resistance portion 45 to a constant level. The voltage corresponding to the increase in resistance of the preliminary heater diffusion resistance portion 45 is obtained in the following manner. In the sensitivity adjusting amplifier circuit 12F1, the temperature control heater diffusion resistance portion 42 having the same temperature characteristics as the preliminary heater diffusion resistance portion 45, the resistors 80 to 82, and the operational amplifier 89 constitute a bridge circuit. The resistance of the diffusion resistance portion 42 is increased in the same manner as in the diffusion resistance portion 45 according to an increase in the ambient temperature, and a resultant unbalanced voltage generated by an increase in resistance of the diffusion resistance portion 42 is amplified by the operational amplifier 89. A voltage from the operational amplifier 89 is the voltage corresponding to the increase in resistance of the diffusion resistance portion 45. Thus, when the power consumption of the preliminary heater diffusion resistor 45 is controlled to a constant level, a change in the resistance of the diffusion resistance portion 45 can be compensated and made linear with respect to a change in ambient temperature.

Figure 9:
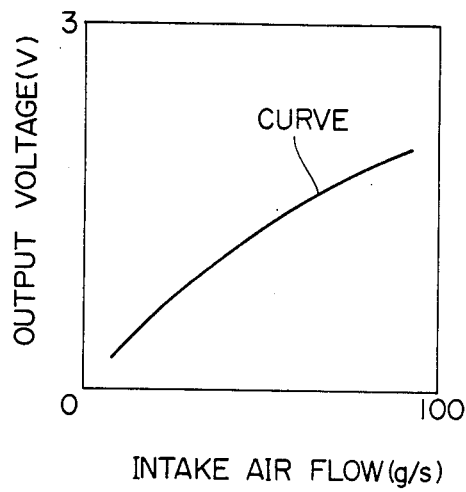
FIG. 9 is a graph showing the relationship between the output voltage and the intake air flow.

The operation circuit 12 controls heat from the temperature control heater 43 in such a manner that a potential difference between points (a) and (b) of the diodes 41 and 44 becomes equal to the offset voltage. A temperature difference between the diodes 41 and 44 can be controlled to a predetermined value. Under this condition, the power consumed by the temperature control heater 43 has a predetermined correlation with the flow rate of intake air. More particularly, this power is increased with respect to the flow rate along a predetermined curve. Furthermore, since the preliminary heater 45 is controlled by the constant power consumption circuit 12F, the diode 44 can be easily heated when the intake air flow is small, thereby decreasing the power consumption of the temperature control heater 43. The power consumed by the temperature control heater 43 is generated as a voltage appearing at point (c). Therefore, a signal corresponding the flow rate of intake air is generated at the terminal OUT, as indicated by a curve in FIG. 9.

Figure 10A:
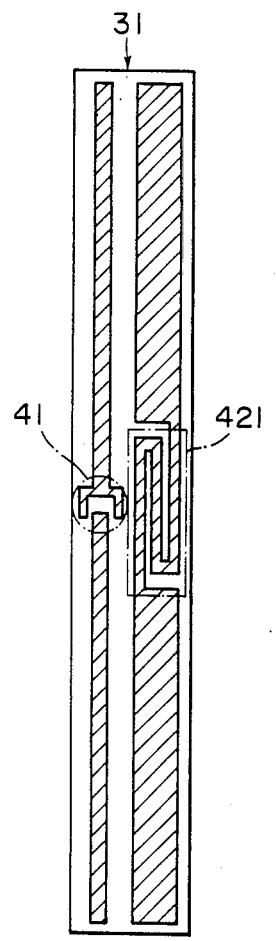
FIGS. 10A and 10B, respectively, are front views of a semiconductor chip used in another embodiment of the present invention.
Figure 10B:
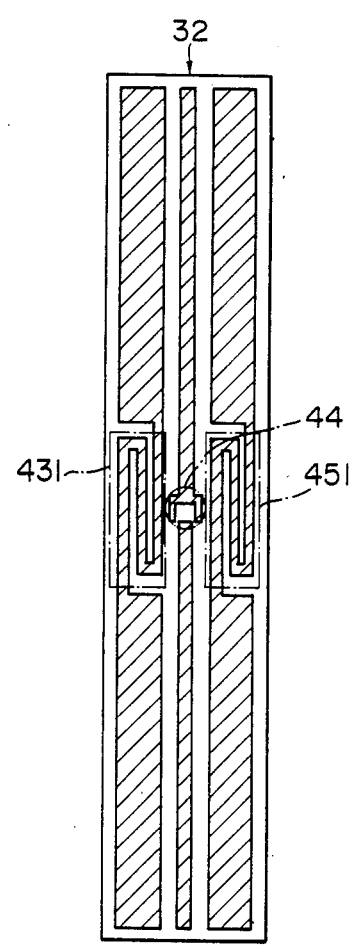

Another embodiment of the present invention will be described with reference to FIGS. 10A and 10B. In the heater of the semiconductor chips 31 and 32 of a sensing portion 11, reference numerals 421, 431 and 451 denote thin metal film resistors of nickel, copper, platinum or the like formed by vacuum deposition or RF sputtering. A change in resistance of the heater comprising the thin metal film resistor becomes more linear than that of the heater comprising the diffusion resistance portion in accordance with a change in ambient temperature. Therefore, the ambient temperature characteristic of the heater comprising a thin metal film resistor becomes better than that of the heater comprising a diffusion resistance portion. Other arrangements of this embodiment are substantially the same as those of the previous embodiment.

Figure 11A:
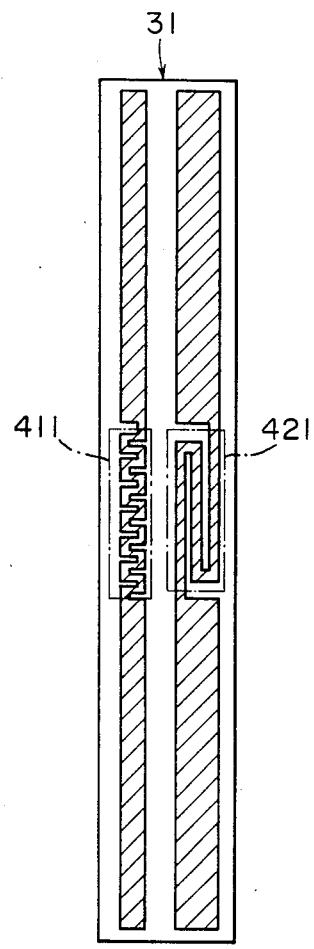
FIGS. 11A and 11B, respectively, are front views of a semicondutor chip used in still another embodiment of the present invention.
Figure 11B:
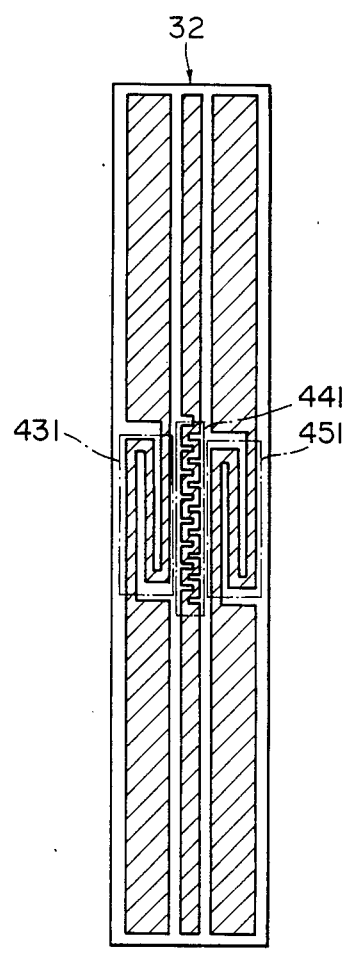

Still another embodiment of the present invention will be described with reference to FIGS. 11A and 11B. In this embodiment, temperature detecting elements 41 and 44 of the semiconductor chips 31 and 32 of a sensing portion 11 do not comprise diodes but are thin metal film resistors of nickel, copper, platinum or the like formed by vacuum deposition or RF sputtering. In addition, components designated by reference numerals 421, 431 and 451 comprise thin metal film resistors, as shown in FIGS. 10A and 10B. The semiconductor chips 31 and 32 comprise only thin metal film resistors, thereby simplifying the fabrication process.

We claim:

1. A flow rate detecting apparatus comprising:
a first semiconductor structure, arranged at a first position in a flow path to be flow rate detected, including a first temperature detection element for detecting ambient air temperature, and a first temperature control heater constituted by a diffusion resistance portion of said semiconductor structure for heating air in the vicinity of said first heater and providing a voltage signal in response to ambient air temperature;
a second semiconductor structure, arranged at a second position in said flow path downstream of said first semiconductor structure, including a second temperature control heater producing heat by a flow of current therein, said second temperature control heater having a resistance that is a function of ambient air temperature, a preliminary heater controlled to generate heat in response to a change of voltage across said first temperature control heater, and a second temperature detection element for detecting heat generated by said second temperature control heater and said preliminary heater, said second temperature control heater and said preliminary heater being constituted by diffusion resistance portions of said second semiconductor structure;

a first current conduction control means for controlling current conduction through said preliminary heater so as to maintain constant heat generation by said preliminary heater;

a second conduction control means for controlling current conducting through said second temperature control heater on the basis of the temperature detected by said first and second temperature detection elements; and output means for outputting a signal that is a function of the state of current conduction through said second temperature control heater which signal provides an indication of flow rate.

2. An apparatus according to claim 1 wherein said first and second semiconductor structures are arranged at different levels within said flow path.

3. An apparatus according to claim 1, wherein said first semiconductor structure has the same chip pattern as that of said second semiconductor structure.

4. A flow rate sensor according to claim 1, wherein said first and second temperature detection elements are diode structures.

5. A flow rate sensor according to claim 1 wherein said first and second temperature detection elements are transistor structures.

6. A semiconductor type flow rate detecting apparatus, for detecting the flow rate of a gas stream, comprising:

a sensing portion including:
  a first semiconductor chip structure arranged at a first position in a flow path of said gas stream, including a first temperature detecting element for detecting ambient air temperature, and a first temperature control heater providing a voltage signal in response to ambient air temperature, and
  a second semiconductor chip structure arranged at a second position in said flow path downstream of said first position, including a second temperature control heater producing heat by a flow of current therein, said second temperature control heater having a resistance that is a function of ambient air temperature, a second temperature detecting element for detecting the temperautre of said second heater, and a preliminary heater controlled to generate heat in response to a change of voltage across said first temperature control heater, said preliminary heater and said second temperature control heater having substantially identical temperature characteristics; and an operation circuit including means for controlling heat generated by said second temperature control heater and providing a signal indicating the flow rate of said gas stream, said operation circuit including:
  a buffer circuit for adjusting for variations in temperature coefficients of said first and second temperature detecting elements and detecting potentials of said first and second temperature detecting elements,
  a differential amplifier having inverting and noninverting inputs for differentially amplifying the potentials of said first and second temperature detecting elements,
  an offset circuit for reducing a voltage supplied to said inverting input of said differential amplifier by an amount corresponding to an offset voltage, so as to establish the potential difference between said first and second temperature detecting elements to be said offset voltage so that the power consumed by said second temperature control heater has a predetermined correlation with the flow rate of said gas stream,
  drive transistor means, responsive to an output of said differential amplifier, for controlling power dissipated by said second temperature control heater,
  a constant power consumption circuit for controlling power consumption of said preliminary heater to be substantially constant, and
  an output circuit for providing an output signal that is a function of current conduction through said second temperature control heater, which output signal provides an indication of detected flow rate.

7. An apparatus according to claim 6 wherein said constant power consumption circuit comprises:
  a circuit for controlling a sensitivity of a diffusion resistance of said first and second temperature control heaters;
  a subtracter circuit for subtracting from a power source voltage a voltage corresponding to an increase of diffusion resistance of said preliminary heater; and
  a constant current circuit.

* * * * *